United States Patent
Bergin

(10) Patent No.: US 10,359,510 B2
(45) Date of Patent: Jul. 23, 2019

(54) TWO-CHANNEL ARRAY FOR MOVING TARGET INDICATIONS

(71) Applicant: INFORMATION SYSTEMS LABORATORIES, INC., San Diego, CA (US)

(72) Inventor: Jameson S. Bergin, Glastonbury, CT (US)

(73) Assignee: INFORMATION SYSTEMS LABORATORIES, INC., San Diego, CA (US)

( * ) Notice: Subject to any disclaimer, the term of this patent is extended or adjusted under 35 U.S.C. 154(b) by 707 days.

(21) Appl. No.: 15/006,860

(22) Filed: Jan. 26, 2016

(65) Prior Publication Data

US 2017/0212217 A1    Jul. 27, 2017

(51) Int. Cl.
    *G01S 13/02* (2006.01)
    *G01S 13/00* (2006.01)
    *G01S 13/90* (2006.01)

(52) U.S. Cl.
    CPC ........ *G01S 13/0209* (2013.01); *G01S 13/003* (2013.01); *G01S 13/9029* (2013.01); *G01S 2013/0254* (2013.01); *G01S 2013/0272* (2013.01)

(58) Field of Classification Search
    CPC ............... G01S 13/0209; G01S 13/003; G01S 13/9029; G01S 2013/0254; G01S 2013/0272
    USPC ...................................................... 342/25 B
    See application file for complete search history.

(56) References Cited

U.S. PATENT DOCUMENTS

| 2,575,047 | A | * | 11/1951 | Crosby | .................... H04B 1/30 |
| | | | | | 455/143 |
| 2,802,898 | A | * | 8/1957 | MacDowell | ......... H04B 17/403 |
| | | | | | 348/180 |
| 3,056,129 | A | * | 9/1962 | Albersheim | ........... H01Q 25/00 |
| | | | | | 342/140 |

(Continued)

FOREIGN PATENT DOCUMENTS

| EP | 0509842 A2 * | 10/1992 | ............. G01S 7/032 |
| EP | 0509843 A2 * | 10/1992 | ............. G01S 7/032 |
| EP | 2462462 B1 * | 12/2013 | ........... G01S 7/2923 |

*Primary Examiner* — Bernarr E Gregory
*Assistant Examiner* — Nuzhat Pervin
(74) *Attorney, Agent, or Firm* — Nydegger & Associates

(57) ABSTRACT

A radar antenna system includes a single transmitter for creating pulses from a wideband waveform. A splitter divides each pulse into half-power pulses, and sends them along respective paths. On one path, successive half-power pulses are alternately modulated with a phase shift $\phi_A$ or $\phi_F$. On the other path, the half-power pulses are not modulated. Each modulated half-power pulse is then combined with an un-modulated half-power pulse to transmit pulses of a full aperture beam with either $\phi_A$ or $\phi_F$. This establishes two degrees of freedom for the system. Two separate receivers then simultaneously receive the pulse echoes and a signal processor uses the consequent four degrees of freedom to create a radar indicator with mitigated clutter and useable azimuth estimation. A coherent processing interval can then be selected for multi-mode operation of the system.

16 Claims, 2 Drawing Sheets

(56) References Cited

U.S. PATENT DOCUMENTS

| | | | | | |
|---|---|---|---|---|---|
| 3,161,870 | A | * | 12/1964 | Pincoffs | G01S 13/87 342/59 |
| 3,184,739 | A | * | 5/1965 | Frederick | G01S 13/46 342/126 |
| 4,430,655 | A | * | 2/1984 | Rittenbach | G01S 13/42 342/136 |
| 5,103,233 | A | * | 4/1992 | Gallagher | G01S 13/22 342/408 |
| 5,115,243 | A | * | 5/1992 | Perry | G01S 7/282 342/137 |
| 5,115,244 | A | * | 5/1992 | Freedman | G01S 13/22 342/137 |
| 5,128,683 | A | * | 7/1992 | Freedman | G01S 7/032 342/158 |
| 5,146,616 | A | * | 9/1992 | Tang | G01S 7/282 342/13 |
| 5,172,118 | A | * | 12/1992 | Peregrim | G01S 7/36 342/191 |
| 5,172,119 | A | * | 12/1992 | Young | G01S 7/2813 342/25 A |
| 5,172,120 | A | * | 12/1992 | Slawsby | G01S 13/22 342/132 |
| 5,172,122 | A | * | 12/1992 | Peregrim | G01S 7/2813 342/154 |
| 5,172,125 | A | * | 12/1992 | Peregrim | G01S 13/4481 342/154 |
| 5,173,703 | A | * | 12/1992 | Mangiapane | G01S 13/90 342/149 |
| 5,173,706 | A | * | 12/1992 | Urkowitz | G01S 7/032 342/101 |
| 5,173,707 | A | * | 12/1992 | Mangiapane | G01S 13/90 342/149 |
| 5,175,554 | A | * | 12/1992 | Mangiapane | G01S 13/4481 342/149 |
| 5,185,608 | A | * | 2/1993 | Pozgay | G01S 7/024 342/17 |
| 5,223,842 | A | * | 6/1993 | Okurowski | G01S 7/36 342/173 |
| 5,225,838 | A | * | 7/1993 | Kanter | G01S 7/36 342/61 |
| 5,225,839 | A | * | 7/1993 | Okurowski | G01S 7/025 342/174 |
| 5,239,309 | A | * | 8/1993 | Tang | F41H 11/12 342/13 |
| 5,245,347 | A | * | 9/1993 | Bonta | G01S 7/2813 342/149 |
| 5,872,628 | A | * | 2/1999 | Erskine | G01S 7/352 356/28.5 |
| 6,593,875 | B2 | | 7/2003 | Bergin et al. | |
| 6,677,890 | B2 | | 1/2004 | Halsey et al. | |
| 6,690,318 | B1 | | 2/2004 | Tsunoda | |
| 6,738,009 | B1 | | 5/2004 | Tsunoda | |
| 7,330,666 | B1 | * | 2/2008 | Koley | H04B 10/505 398/188 |
| 7,535,409 | B1 | * | 5/2009 | Choe | G01S 7/282 342/159 |
| 7,714,782 | B2 | * | 5/2010 | Davis | H01Q 21/22 342/377 |
| 7,978,120 | B2 | * | 7/2011 | Longstaff | G01S 7/414 342/179 |
| 8,169,362 | B2 | * | 5/2012 | Cook | G01S 7/2923 342/162 |
| 2003/0112184 | A1 | * | 6/2003 | Jenabi | H01Q 21/0025 343/700 MS |
| 2005/0031051 | A1 | * | 2/2005 | Rosen | H04B 1/713 375/295 |
| 2005/0041752 | A1 | * | 2/2005 | Rosen | H04L 27/001 375/268 |
| 2005/0041758 | A1 | * | 2/2005 | Rosen | H04L 27/001 375/316 |
| 2005/0084033 | A1 | * | 4/2005 | Rosen | H04B 1/69 375/295 |
| 2011/0025546 | A1 | * | 2/2011 | Cook | G01S 7/2923 342/22 |

* cited by examiner

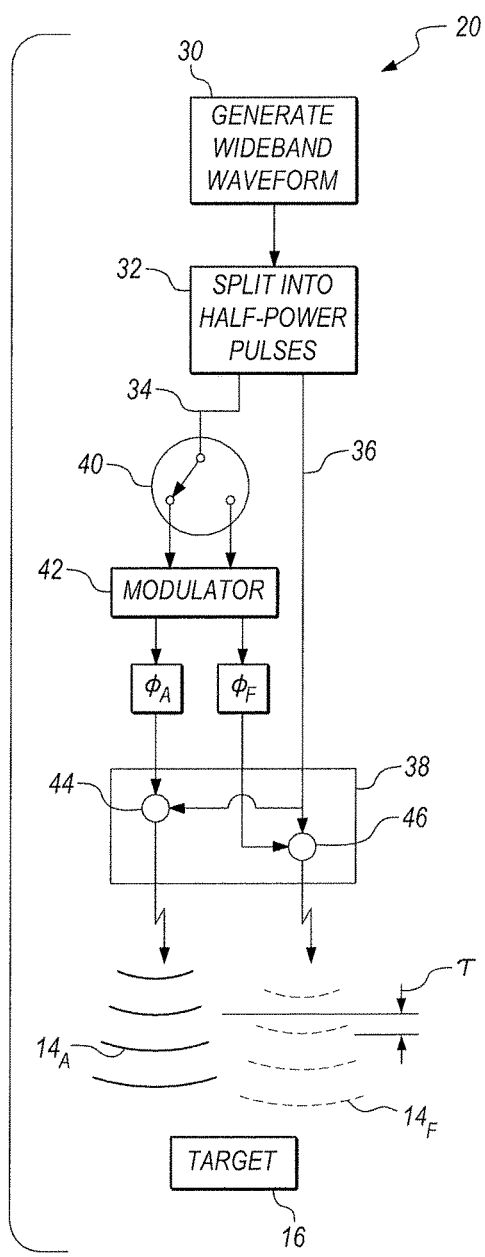
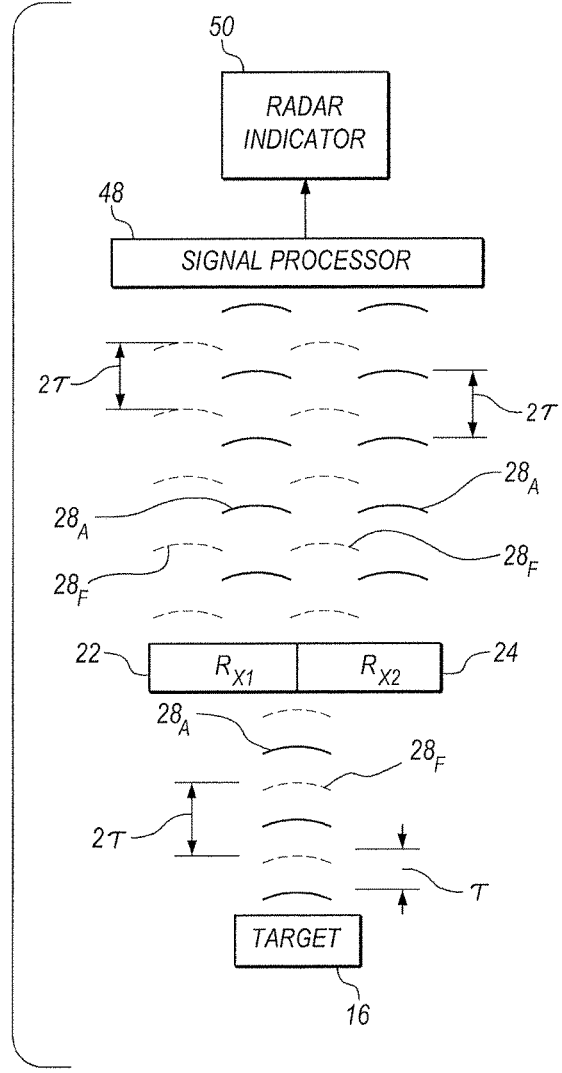
FIG. 3A
FIG. 3B

TWO-CHANNEL ARRAY FOR MOVING TARGET INDICATIONS

The U.S. Government has a paid-up license in this invention and the right in limited circumstances to require the patent owner to license others on reasonable terms as provided for by the terms of Contract No. W31P4Q-11-C-0043 awarded by U.S. Army Contracting Command.

FIELD OF THE INVENTION

The present invention pertains generally to radar antenna systems. More particularly, the present invention pertains to radar antennas that operate with a single input, to create multiple outputs for enhanced performance of the system with multiple degrees of freedom. The present invention is particularly, but not exclusively, useful as a radar antenna system that incorporates a single wideband waveform transmitter, with two receivers, to achieve four degrees of freedom for use in creating a radar indicator having effective target detection and high-resolution angle estimation for slow-moving targets in clutter (i.e. endo-clutter targets).

BACKGROUND OF THE INVENTION

Basically, radar systems operate by transmitting an electromagnetic waveform from an antenna. The waveform can then be reflected by an object (target) as an echo (return signal). When this echo (return signal) is received, it is processed for presentation on a radar indicator. In a perfect case, one wherein there isn't any unwanted interference, the radar return signal (echo) can be processed to obtain clearly observable indications of target range, azimuth angle ($\theta$), and elevation/depression angle ($\gamma$), relative to the radar antenna. In an actual real-time application, however, there will always be clutter and interference.

In order to provide for more robust systems, having clearer radar indications with accurate signal resolution and enhanced performance characteristics, several improved radar architectures have been proposed. For instance, one such radar system architecture may include Multiple Inputs [i.e. transmitters] and Multiple Outputs [i.e. receivers] (MIMO). For each of these architectures the objective has been to reduce clutter and increase azimuth estimation by increasing the system's space-time Degrees of Freedom (DoFs). This is a particularly important consideration for radar systems having relatively small apertures.

As used in this disclosure, each DoF is considered as being a separate perspective of the target. Technically, a DoF can be established geometrically (e.g. based on transmitter or receiver location), or electronically (e.g. phase shift in the transmitter radar beam). In either case, each DoF is established using a unique transmitter and a unique receiver. An important aspect of this is that for a given target, the more DoFs (perspectives) there are, the more pertinent information there is for signal processing purposes. For example, a radar system having two transmitters and two receivers will have four DoFs, and will have more useable information than can be generated with fewer DoFs. The particular application, however, may limit the number of transmitters and receivers that can be effectively used in a system.

In addition to the useable DoFs a system may have, there are other important operational considerations. For the particular case of an Unmanned Aerial Vehicle (UAV), the flight envelope of the UAV is a major consideration. Of particular interest here is an ability for a radar system that is mounted on a UAV to function properly both while the UAV is stationary, and while it is in forward flight. More particularly, for a well known Ground Moving Target Indications (GMTI) mode of operation, it is best if the radar system is held stationary and uses a narrow band waveform. On the other hand, for a Synthetic Aperture Radar (SAR) mode of operation, it is best if the radar system is moving and employs a much wider bandwidth. For a UAV application, both modes of operation are needed.

In light of the above, it is an object of the present invention to provide a radar antenna system that uses an innovative wideband waveform concept for simultaneous SAR and GMTI operations. Another object of the present invention is to provide a radar antenna system that will enable small UAV radars to detect, track and image both vehicles and dismounts in a wide range of operational environments. Yet another object of the present invention is to provide a radar antenna system that uses a single transmitter with a wideband waveform to alternately transmit pulses with different phases (2 DoFs), and that uses two receivers (2 DoFs) to simultaneously receive echoes having the different phases, to establish a system having four DoFs. Still another object of the present invention is to provide a radar antenna system that is easy to use, is relatively simple to manufacture and is comparatively cost effective.

SUMMARY OF THE INVENTION

In accordance with the present invention, a radar antenna system is provided that effectively incorporates a single waveform transmitter which cooperates with two receivers to achieve four degrees of freedom (i.e. four different perspectives) for use in creating a radar indicator. Specifically, with the four degrees of freedom provided by the present invention, the system is able to achieve target detection and high-resolution angle estimation for slow-moving targets in clutter (i.e. endo-clutter targets). Also, it is an important aspect of the present invention that the radar antenna system is compatible for use in either a substantially Synthetic Aperture Radar (SAR) mode, or a substantially Ground Moving Target Indication GTMI mode. With this compatibility, the present invention is particularly suitable for use on an Unmanned Aerial Vehicle (UAV) platform.

Structurally, the radar antenna system of the present invention includes a generator for creating pulses of a wideband waveform. A splitter then divides the power of each individual pulse in half (i.e. creates pulses of half power). Each half-power pulse is then directed along a separate path. More specifically, a first series of half-power pulses is directed along a first path, and a second series of half-power pulses is directed along a second path. After the pulses have been divided, the half-power pulses on the second path are sent forward without any change (i.e. the waveforms of these half-power pulses are not modulated). This, however, is not the case with the series of half-power pulses that are sent along the first path.

A switch, preferably a Single Pole Double Transmit (SPDT) switch, is positioned on the first path. In detail, this switch is used to alternately impose a first phase shift ($\phi_A$) or a second phase shift ($\phi_F$) on successive half-power pulses as they travel along the first path (i.e. there is a bi-phase modulation of the half-power pulses on the first path). For the present invention, the phase shifts ($\phi_A$ and $\phi_F$) are fixed, and are imposed, in sequence, pulse-to-pulse. The consequence of all this is that when a modulated half-power pulse on the first path (with its imposed phase shift $\phi_A$ or $\phi_F$) is combined with an un-modulated half-power pulse on the second path, a full aperture beam is formed. Importantly, depending on the phase shift that was imposed on the particular half-power pulse $\phi_A$ or $\phi_F$), the resultant full aperture beams will have a unique steering direction. In effect, these respective phases will cause the full aperture beam to be alternately steered with either an aft (A) inclination or a forward (F) inclination. Accordingly, based on $\phi_A$ or $\phi_F$, the alternately transmitted full aperture beams will each represent a different transmit degree of freedom (i.e. perspective).

As mentioned above, in addition to the single wideband waveform transmitter, the system of the present invention also includes two receiver antennas (i.e. a first receiver antenna and a second receiver antenna). Together, the two receivers establish two receiver spatial degrees of freedom. Within this structure, both the first receiver antenna and the second receiver antenna will simultaneously receive echoes (i.e. return signals) of the transmitted pulses, regardless of their modulation. Further, as a result of the unique switching and phasing on the first transmitted signal path discussed above, it is possible to reorder the received pulses (echoes) at each receiver. Importantly, this reordering separates pulses according to the unique steering direction of the transmitted beam (i.e. $\phi_A$ or $\phi_F$). Thus, this reordering effectively synthesizes an additional two transmit spatial degrees of freedom. When combined, the two receive spatial degrees-of-freedom, and the two transmit degrees of freedom, provide for a total of four spatial degrees of freedom.

For the present invention, the reordering of signals is accomplished by sorting or separating the pulses received on each receiver into two subsets of pulses that can arbitrarily be classified as being odd or even. The even pulses provide the first synthesized spatial degree of freedom and the odd pulses provide the second synthesized spatial degree of freedom. The reason these subsets provide a unique spatial degree of freedom is because they each represent a different "look," because they represent either the Aft (A) of forward (F) inclination of the transmit beam. The four spatial degrees of freedom are then available for use in the radar signal processor to cancel clutter, detect targets, and compute high resolution target angle-of-arrival information. As intended for the present invention, this processing can be accomplished using Space-Time Adaptive Processing (STAP) techniques.

In operation, a Coherent Processing Interval (CPI) is selected depending on the particular operational requirements. For instance, it may be desirable to provide for usable image resolution with the system operating in a Synthetic Aperture Radar (SAR) mode. On the other hand, a different CPI can be chosen to be a subinterval of a phase history for the SAR mode that will provide for sufficient contrast having a usable target-to-clutter ratio in a GMTI mode. In sum, a CPI for use with the present invention is variable and can be selected as desired.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3A is an operational schematic, for the system of the present invention, showing how a single transmit wideband waveform can be manipulated to create two different transmit beams; and FIG. 3B is an operational schematic, for the system of the present invention, showing how the two different transmit beams shown in FIG. 3A can each be further manipulated to establish four degrees of freedom (perspectives) for presenting an image on a radar indicator with minimized clutter and useable azimuth estimation.

DESCRIPTION OF THE PREFERRED EMBODIMENTS

Figure 1:
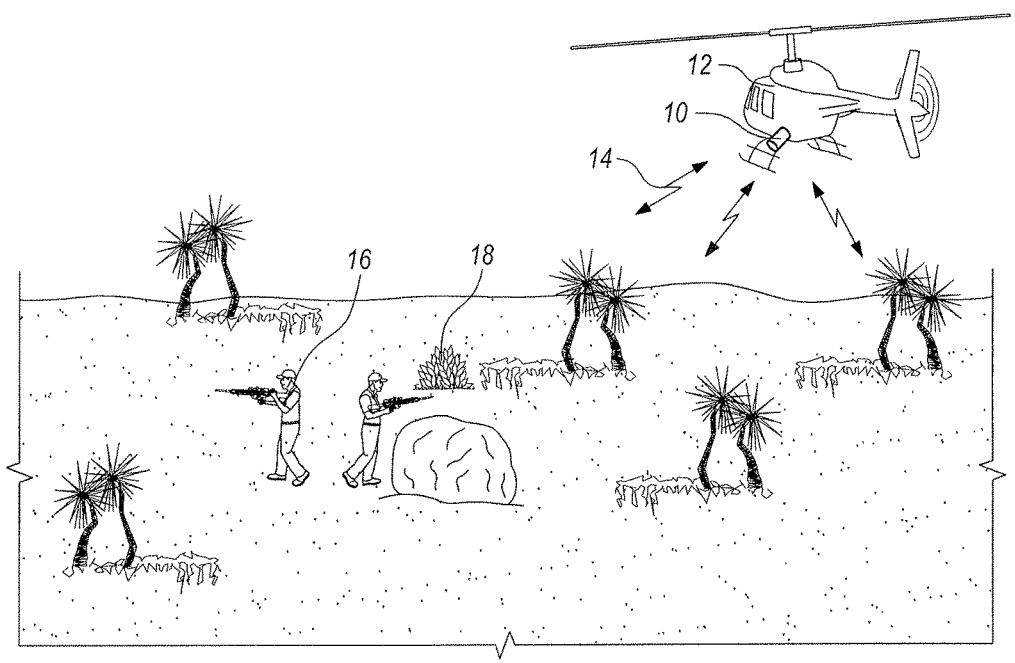
FIG. 1 is a depiction of a radar antenna system for the present invention as it is intended to be used in a typical operational environment.

Referring initially to FIG. 1 a radar antenna system in accordance with the present invention is shown in an operational environment and is designated 10. As shown, the system 10 is mounted on an Unmanned Aerial Vehicle (UAV) 12 to generate a pulsed radar beam 14 that can be used to detect a slow moving target 16 (e.g. troop movements). As envisioned for the system 10, this will be so, even though the target 16 may be partially obscured by ground clutter 18. For purposes of the present invention, the radar beam 14 can be any wideband waveform known in the pertinent art that can be pulsed in a manner as disclosed below. In operation, there will be a pulse interval "$\tau$" between successive pulses of the radar beam 14. For the system 10, $\tau$ will preferably be less than about one second.

Figure 2A:
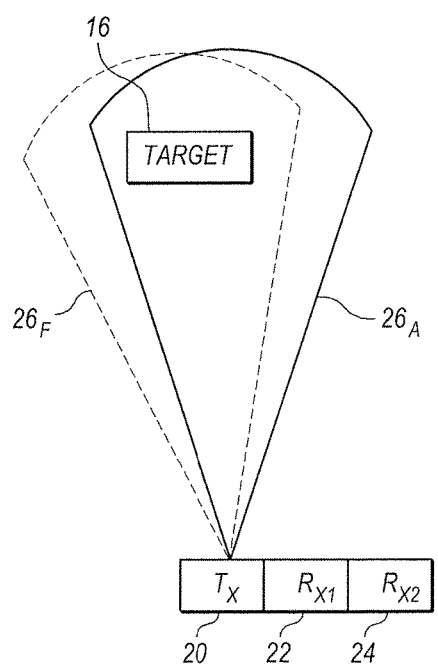
FIG. 2A is a functional schematic, for the transmit side of the radar system of the present invention, showing how a single waveform generator can be used to synthesize two different transmit beams to thereby establish two different transmit degrees-of-freedom.

With reference now to FIG. 2A, it will be seen that the system 10 includes a single transmitter 20 ($T_x$), but it has two different receive antennas (receivers). These receive antennas are respectively designated as a first receiver 22 ($R_{x1}$) and a second receiver 24 ($R_{x2}$). Further, it is to be appreciated with reference to FIG. 2A, that the transmitter 20 is capable of alternately directing the radar beam 14 between a beam field $26_F$ and a beam field $26_A$. More specifically, in accordance with more detailed disclosure below, the radar beam 14 is to be electronically steered to have a forward (F) inclination in the beam field $26_F$, and an aft (A) inclination in the beam field $26_A$. For the purpose of distinguishing one steering inclination from the other, the designations of "F" and "A" are completely arbitrary and are interchangeable.

Figure 2B:
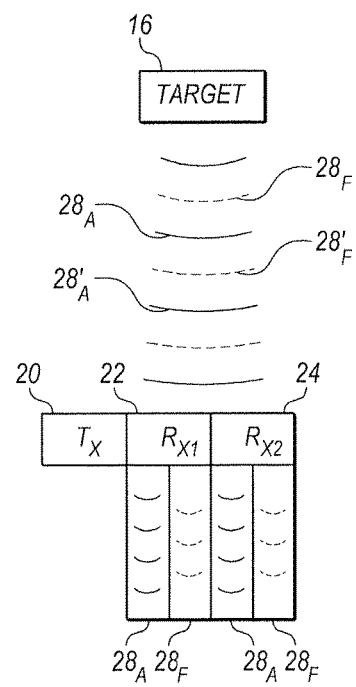
FIG. 2B is a functional schematic, for the receive side of the radar system of the present invention, showing how echoes from each of the two synthesized transmit beams, as illustrated in FIG. 2A, can be individually received by different receivers and then further synthesized to establish four degrees-of-freedom.

As envisioned for the system 10, the target 16 will be covered by the pulsed radar beam 14 in both the beam field $26_F$ and the beam field $26_A$. Thus, as shown in FIG. 2B, both the first receiver 22 and the second receiver 24 will each individually and separately receive a sequence of same return signals (echoes) 28 and 28' et seq. from the target 16. Furthermore, both receivers ($R_{x1}$ 22 and $R_{x2}$ 24) will simultaneously receive echoes $28_F$ which are generated when the radar beam 14 has the forward (F) inclination and they will also simultaneously receive echoes $28_A$ which are generated when the radar beam 14 has the aft (A) inclination.

In FIG. 3A, the transmitter 20 is shown to include a generator 30 that will create a wideband waveform that is pulsed, with a pulse interval "$\tau$". The transmitter 20 also includes a splitter 32 that splits each pulse of the wideband waveform into two, substantially same half-power pulses. The half-power pulses are then directed from the splitter 32 onto either a first path 34 or a second path 36. While the half-power pulses on the second path 36 are not modulated, and are sent directly from the splitter 32 to a combiner 38, the half-power pulses on the first path 34 are sequentially modulated with different phase shifts.

After leaving the splitter 32, succession of half-power pulses on the first path 34 are alternately directed by a switch 40 to a modulator 42. Preferably, the switch 40 is a Single Pole Double Transmit (SPDT) switch. More specifically, the switch 40 operates at the pulse interval τ to separate sequential half-power pulses from each other in order for them to be differently modulated. At the modulator 42, these half-power pulses from the first path 34 will then be given either a phase shift $\phi_A$ or a phase shift $\phi_F$. The modulated half-power pulses are then transferred from the modulator 42 to the combiner 38. There they are sent respectively to either a summing point 44 ($\phi_A$) or a summing point 46 ($\phi_F$). FIG. 3A also shows that the un-modulated half-power pulses on the second path 36 are also sent by the combiner 38 to either the summing point 44 or the summing point 46.

At the summing point 44, a $\phi_A$-modulated half-power pulse is combined with an un-modulated half-power pulse from the second path 36. Similarly, at the summing point 46, a $\phi_F$-modulated half-power pulse is combined with an un-modulated half-power pulse from the second path 36. As a consequence of these manipulations, a full aperture radar beam $14_A$ is established with an aft-inclination, and a different full aperture radar beam $14_F$ is established with a forward-inclination. The full aperture radar beam $14_A$ is then radiated into the beam field $26_A$ and the full aperture radar beam $14_F$ is alternately radiated into the beam field $26_F$ (see FIG. 2A).

As indicated in FIG. 3B, the echoes (return signals) $28_F$ from target 16 are simultaneously received by both the first receiver ($R_{x1}$) 22 and the second receiver ($R_{x2}$) 24. Likewise, the echoes (return signals) $28_A$ from target 16 are simultaneously received by both the first receiver ($R_{x1}$) 22 and the second receiver ($R_{x2}$) 24. The echoes $28_F$ and $28_A$, however, are alternately received, in sequence. It is therefore possible, in each receiver, to sort them out by separating the odd number echoes (e.g. echoes $28_F$) from the even number echoes (e.g. echoes $28_A$). In the event, after being separated, they are all sent to a signal processor 48 for processing. Thus, the signal processor 48 receives four subsets of signals, with each subset having a different perspective, degree of freedom (DoF). Specifically, within this structure, the first receiver 22 and the second receiver 24, respectively provide their own DoF. Further, the different echoes $28_A$ and $28_F$ cause each receiver to establish two DOFs. Thus, in combination, a single transmitter 20 and two receivers ($R_{x1}$ and $R_{x2}$) provide a system 10 with four DoFs for use in creating a radar indicator 50.

While the particular Two-Channel Array for Moving Target Indications as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A radar antenna system which comprises:
   a generator for creating pulses of a wideband waveform;
   a splitter for dividing each individual pulse into a first half-power pulse and a second half-power pulse;
   circuitry for directing the first half-power pulse along a first path, and for directing the second half-power pulse along a second path;
   a switch positioned on the first path to alternately modulate, in sequence, a first phase shift ($\phi_A$), and a second phase shift ($\phi_F$) on successive half-power pulses on the first path;
   a means for combining the modulated half-power pulses from the first path with the un-modulated half-power pulses from the second path to alternately create a first full aperture beam having a unique steering direction determined by the phase shift ($\phi_A$), and a second full aperture beam having a unique steering direction determined by the phase shift ($\phi_F$);
   a first receiver for receiving respective pulse echoes from the first full aperture beam and from the second full aperture beam to establish a first signal;
   a second receiver for receiving respective pulse echoes from the first full aperture beam and second full aperture beam to establish a second signal; and
   a signal processor for using the first and second signals to create a radar indicator.

2. A system as recited in claim 1 wherein the switch is a Single Pole Double Transmit (SPDT) switch.

3. A system as recited in claim 1 wherein a slow-time modulation is employed on half-power pulses on the first path.

4. A system as recited in claim 3 wherein the slow-time modulation is bi-phase.

5. A system as recited in claim 1 wherein a coherent processing interval is selected to mitigate clutter and minimize endo-clutter azimuth estimation.

6. A system as recited in claim 1 wherein the first receiver includes a means for reordering the first signal into a bifurcation, wherein the bifurcation comprises:
   a first subset of pulses with each pulse having the first phase shift ($\phi_A$); and
   a second subset of pulses with each pulse having the second phase shift ($\phi_B$), wherein the first subset combines with the second subset to establish two receive degrees of freedom for the first signal.

7. A system as recited in claim 6 wherein the second receiver includes a means for reordering the second signal into a bifurcation, wherein the bifurcation comprises:
   a first subset of pulses with each pulse having the first phase shift ($\phi_A$); and
   a second subset of pulses with each pulse having the second phase shift ($\phi_B$), wherein the first subset combines with the second subset to establish two receive degrees of freedom for the second signal.

8. A system as recited in claim 7 wherein the two receive degrees of freedom of the first signal, and the two receive degrees of freedom of the second signal, are used together to provide four degrees of freedom for creation of the radar indicator.

9. A method for operating a radar antenna system, wherein use of a transmitter in the system comprises the steps of:
   generating a wideband waveform;
   creating pulses of the waveform;
   splitting each pulse into a first half-power pulse and a second half-power pulse;
   directing a plurality of the first half-power pulse along a first path, and a plurality of the second half-power pulse along a second path;
   alternately modulating, in sequence, a first phase shift ($\phi_A$) and a second phase shift ($\phi_F$) on successive first half-power pulses on the first path;

sequentially combining a modulated first half-power pulse from the first path with an un-modulated second half-power pulse from the second path to alternately create pulses for a first full aperture beam having a unique steering direction, and pulses for a second full aperture beam having a unique steering direction; and alternately transmitting a respective pulse of the first full aperture beam and of the second full aperture beam.

10. A method as recited in claim 9 wherein receiving return signals (echoes) from the first full aperture beam and from the second full aperture beam comprises the steps of:

receiving the pulse echoes with respective phase shifts ($\phi_A$) and ($\phi_F$) at a first receiver to establish a first signal having two degrees of freedom;

receiving pulse echoes with respective phase shifts ($\phi_A$) and ($\phi_F$) at a second receiver to establish a second signal having two degrees of freedom; and combining the first and second signals to use four degrees of freedom for creation of a radar indicator.

11. A method as recited in claim 10 further comprising the steps of:

reordering the first signal into a bifurcation having a first subset of pulses wherein each pulse has the first phase shift ($\phi_A$), and a second subset of pulses wherein each pulse has the second phase shift ($\phi_B$); and separating the first subset from the second subset to establish two degrees of freedom for the first signal.

12. A method as recited in claim 11 further comprising the steps of:

reordering the second signal into a bifurcation having a first subset of pulses wherein each pulse has the first phase shift ($\phi_A$), and a second subset of pulses wherein each pulse has the second phase shift ($\phi_B$); and separating the second subset from the first subset to establish two degrees of freedom for the second signal.

13. A method as recited in claim 12 wherein the two degrees of freedom of the first signal, and the two degrees of freedom of the second signal, are used together in the combining step to provide four degrees of freedom for creation of the radar indicator.

14. A method as recited in claim 9 wherein the alternately modulating step is accomplished using a Single Pole Double Transmit (SPDT) switch.

15. A method as recited in claim 9 further comprising the step of selecting a coherent processing interval to mitigate clutter and minimize endo-clutter azimuth estimation.

16. A method as recited in claim 9 further comprising the step of selecting a coherent processing interval to selectively accommodate Synthetic Aperture Radar (SAR) and Ground Moving Target Indications (GMTI) operations.

* * * * *